US006681656B2

(12) United States Patent
Palmowski

(10) Patent No.: US 6,681,656 B2
(45) Date of Patent: Jan. 27, 2004

(54) ORBITING BLADE COAXIAL CABLE CUTTER/STRIPPER

(75) Inventor: David J. Palmowski, Syracuse, NY (US)

(73) Assignee: Orbital Technologies, Inc., Syracuse, NY (US)

( * ) Notice: Subject to any disclaimer, the term of this patent is extended or adjusted under 35 U.S.C. 154(b) by 0 days.

(21) Appl. No.: 10/359,490

(22) Filed: Feb. 5, 2003

(65) Prior Publication Data

US 2003/0115990 A1 Jun. 26, 2003

Related U.S. Application Data

(63) Continuation of application No. 09/640,843, filed on Aug. 16, 2000, now Pat. No. 6,588,302.

(51) Int. Cl.$^7$ ................................................. H02G 1/12
(52) U.S. Cl. ........................................................ 81/9.51
(58) Field of Search ........................ 81/9.51, 9.4, 9.41, 81/9.42

(56) References Cited

U.S. PATENT DOCUMENTS 4,993,287 A * 2/1991 Carpenter et al. ........... 81/9.51

* cited by examiner

Primary Examiner—Debra S. Meislin
(74) Attorney, Agent, or Firm—George R. McGuire; Bond, Schoeneck & King, PLLC

(57) ABSTRACT

Apparatus for supporting a coaxial cable, or the like, and effecting cutting and stripping operations to remove a portion of one or more layers which concentrically cover a central conductor. A single blade, having a circular cutting edge, is moved in an orbital path about the cable with rotary motion of a motor translated to orbital motion of the blade through a plurality of plates relatively movable on crossed, linear, roller bearings and a shaft eccentrically affixed to the motor with the shaft and motor axes at an acute angle to one another. The shaft extends through a spherical bearing mounted in one of the plates, thereby translating nutational motion of the shaft to orbiting motion of the plate which is directly attached to the blade. A unique clamping assembly includes a pair of jaws having respective gear racks engaging a single pinion gear on a motor output shaft for linear movement of the jaws by equal distances in opposite directions. A microprocessor controls the level of current to the motor, thereby adjusting the clamping force applied to the cable, and increases this force during the stripping operation, when maximum axial force is applied to the cable. A guide bushing establishes the radial position of the cable axis and is stationary during blade movement, thereby permitting the opening in the bushing to closely approximate the cable diameter. The position of the bushing is adjustable to align the central axis of the bushing opening with that of the blade cutting edge. The bushing is also movable to an inoperative position to permit unobstructed access to the blade for replacement thereof. A pair of gripping members are movable to engage the severed portion of the covering layer to assist in the stripping operation, and a unique combination of hardware and software is provided for calibrating the position of the gripping members at equal distances from the axis of the cable.

6 Claims, 16 Drawing Sheets

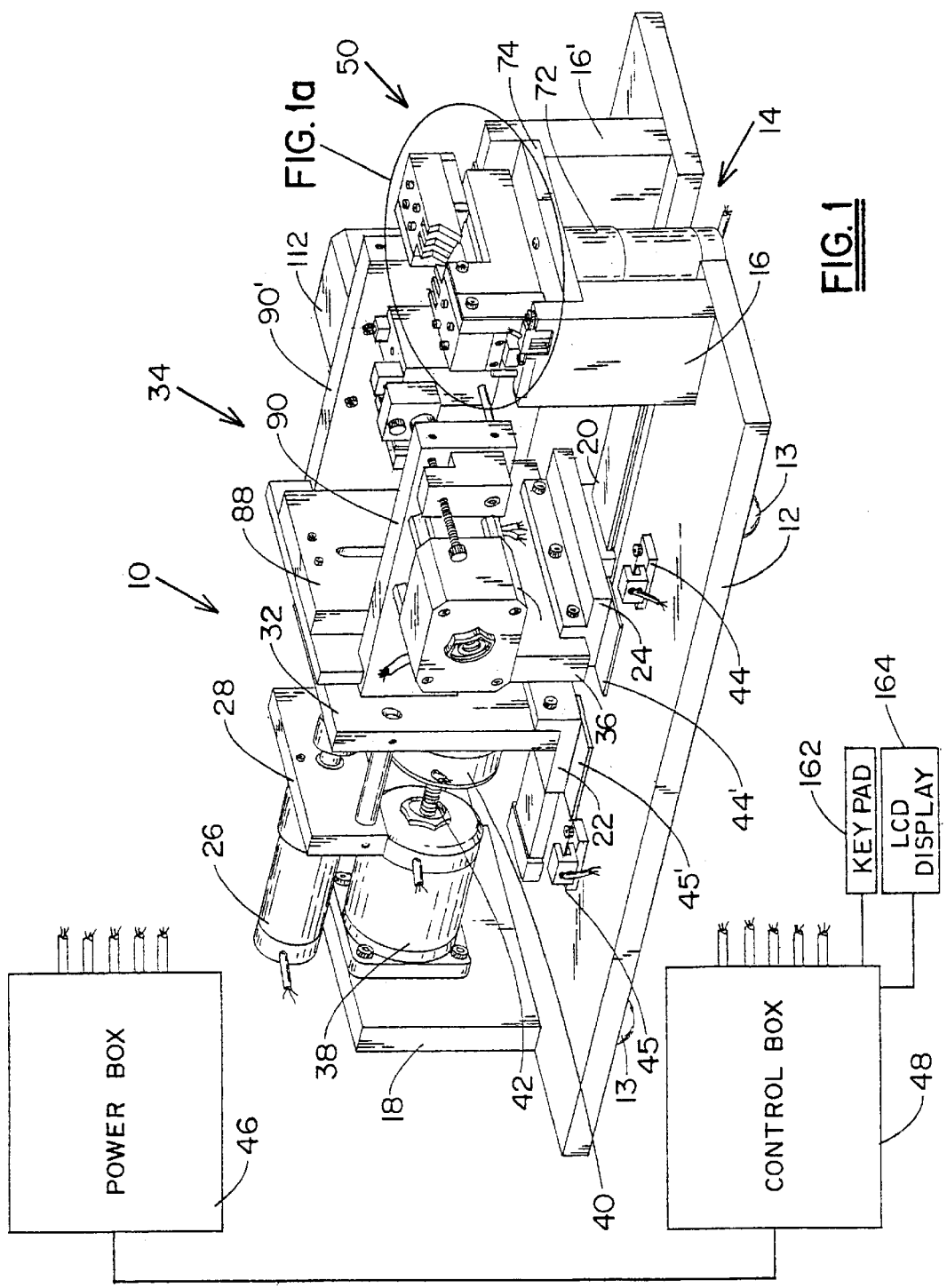

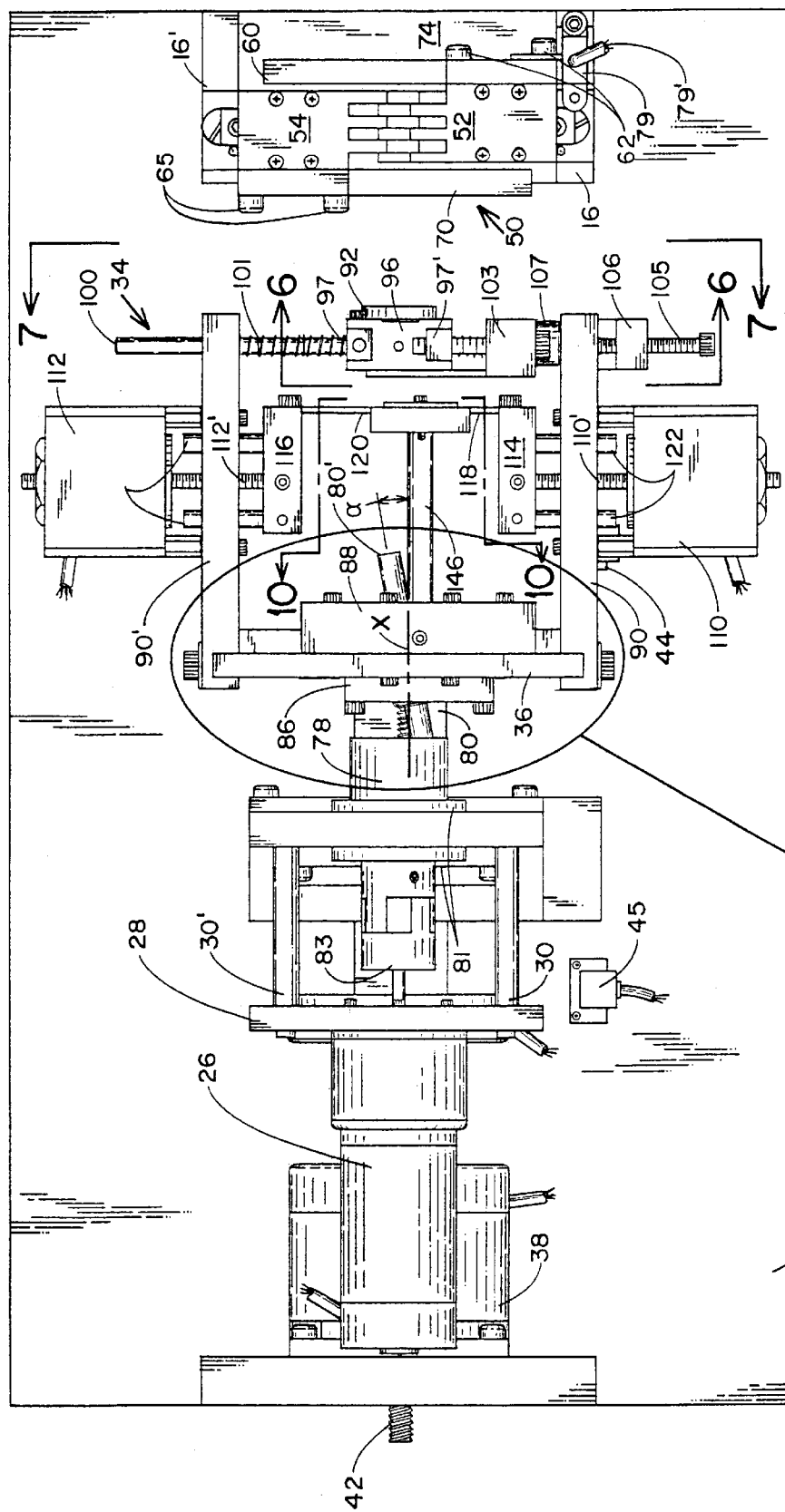

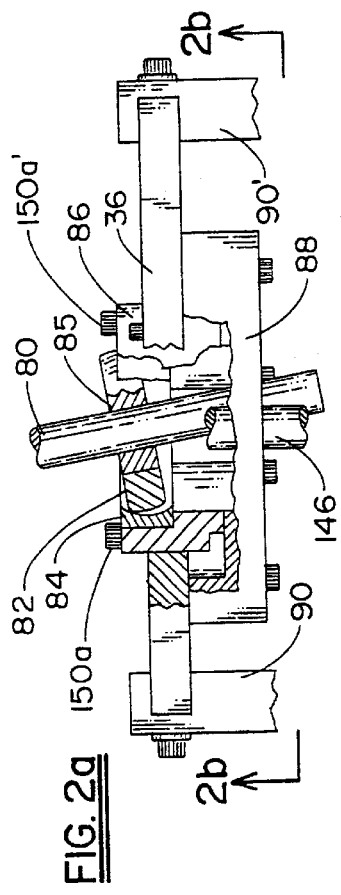
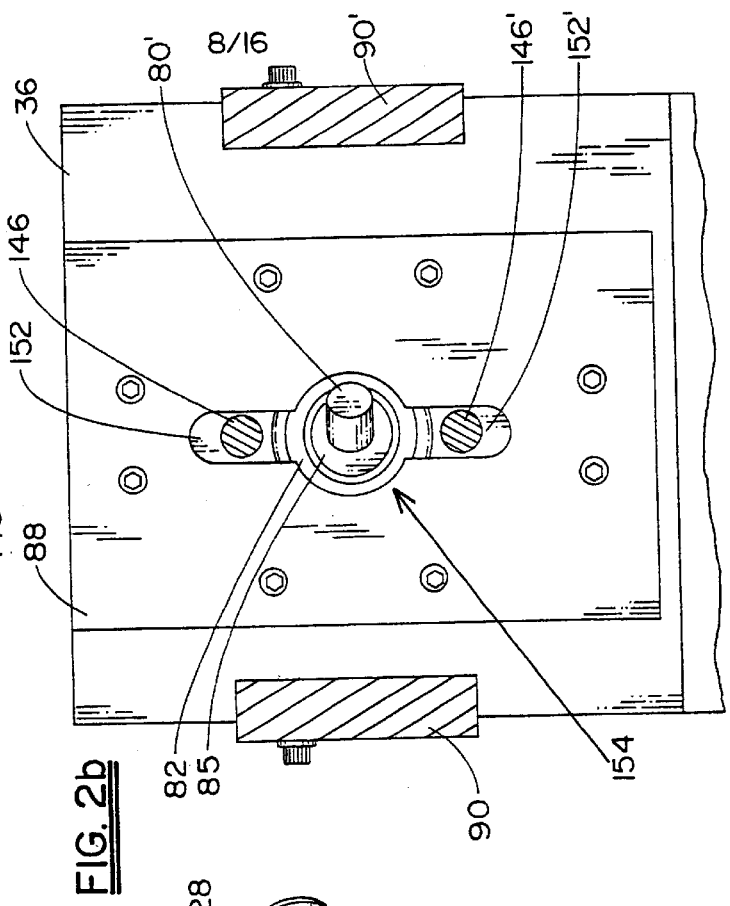
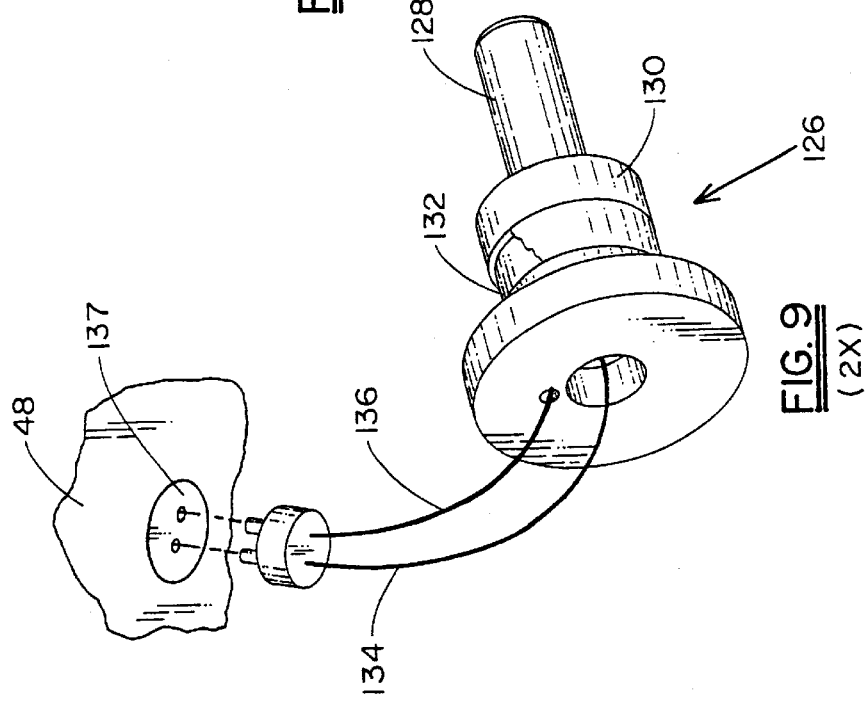

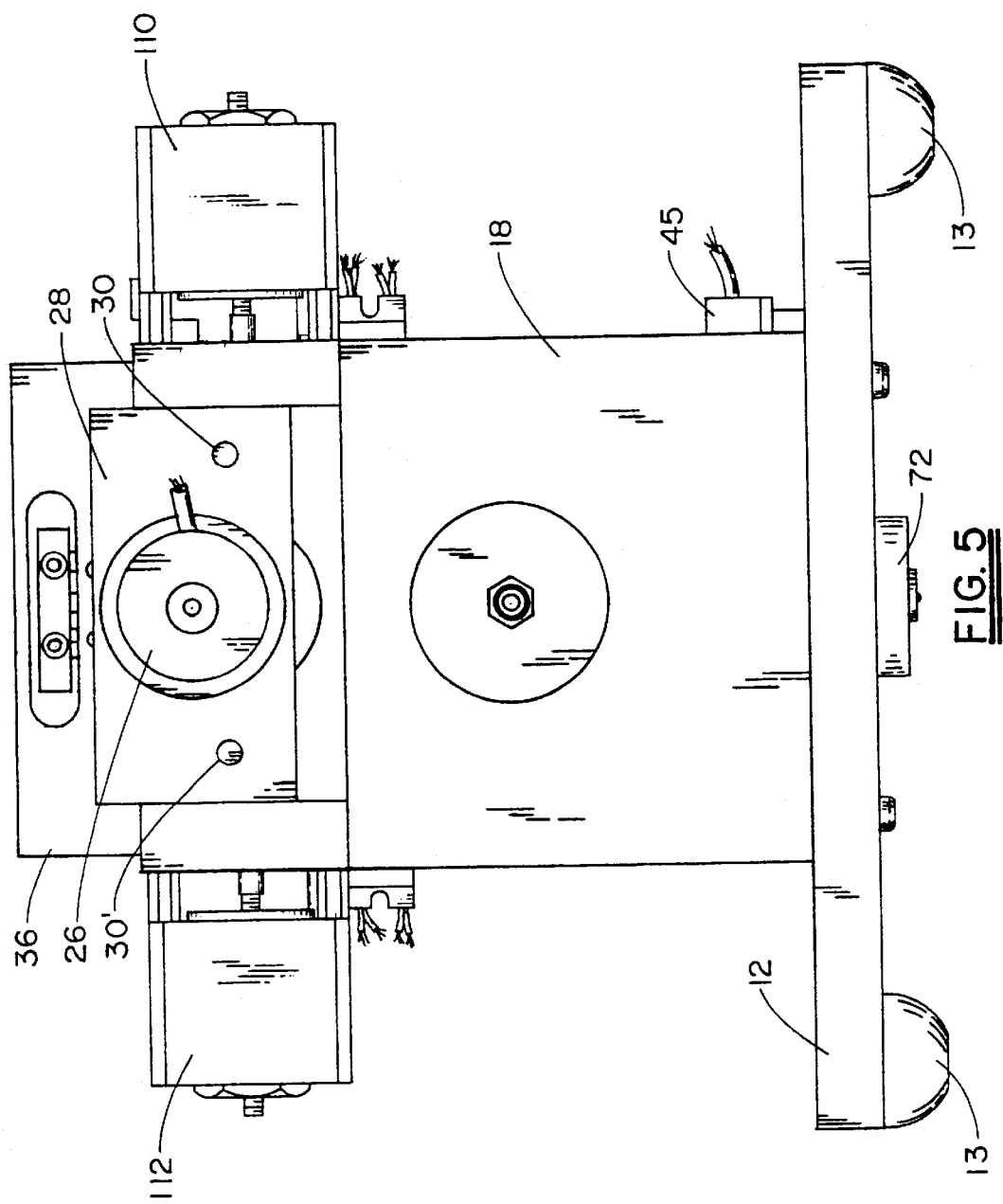

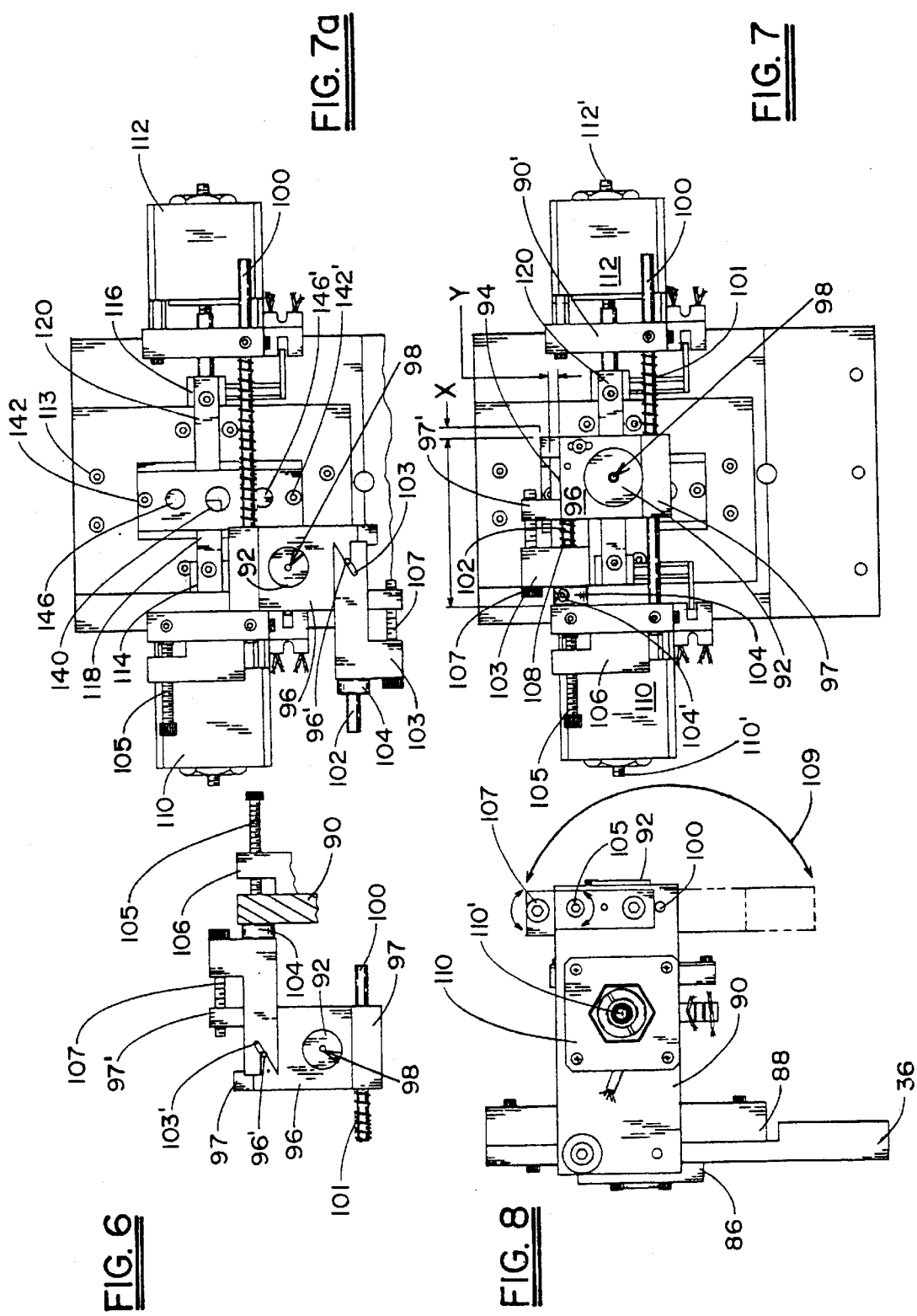

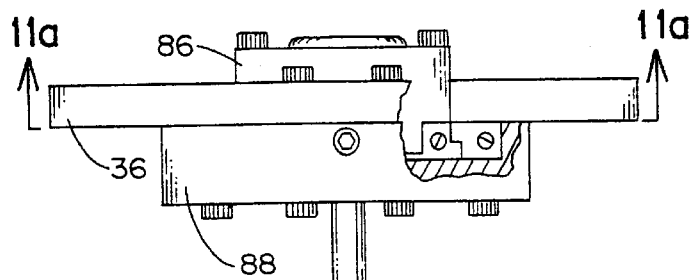
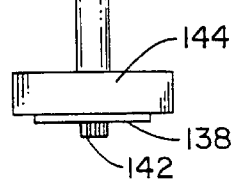
FIG. 11
FIG. 12
FIG. 10
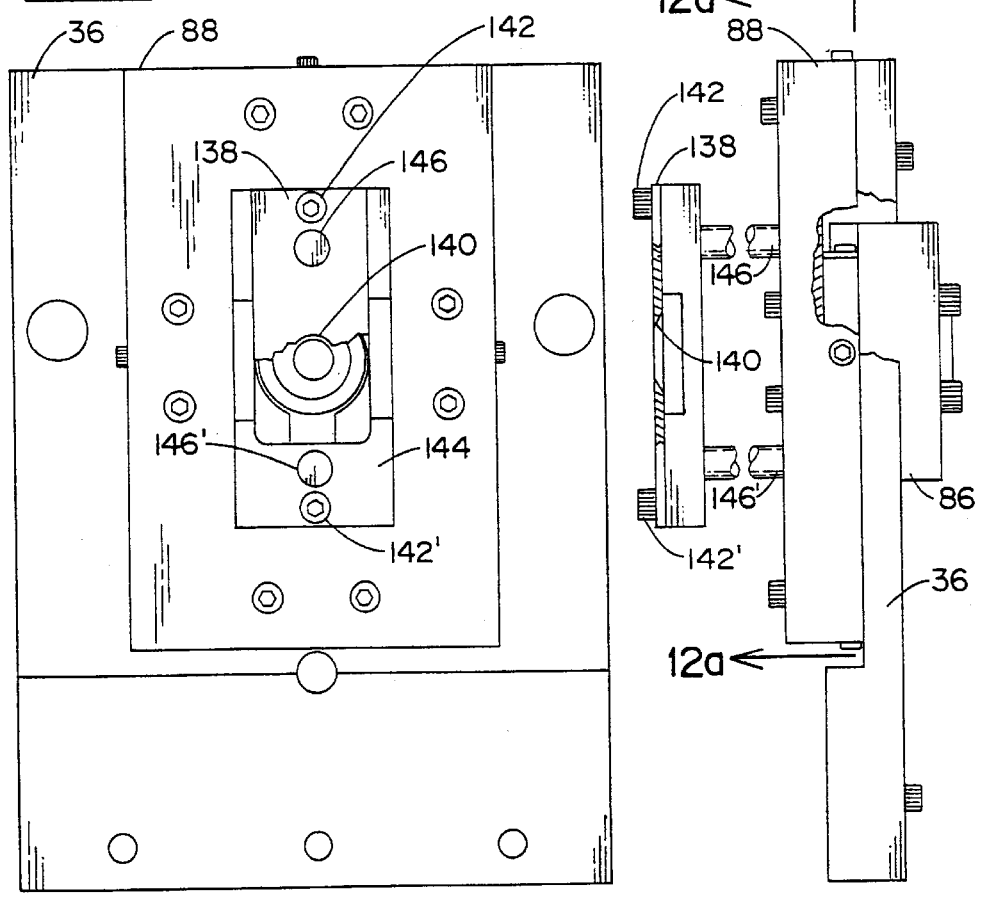

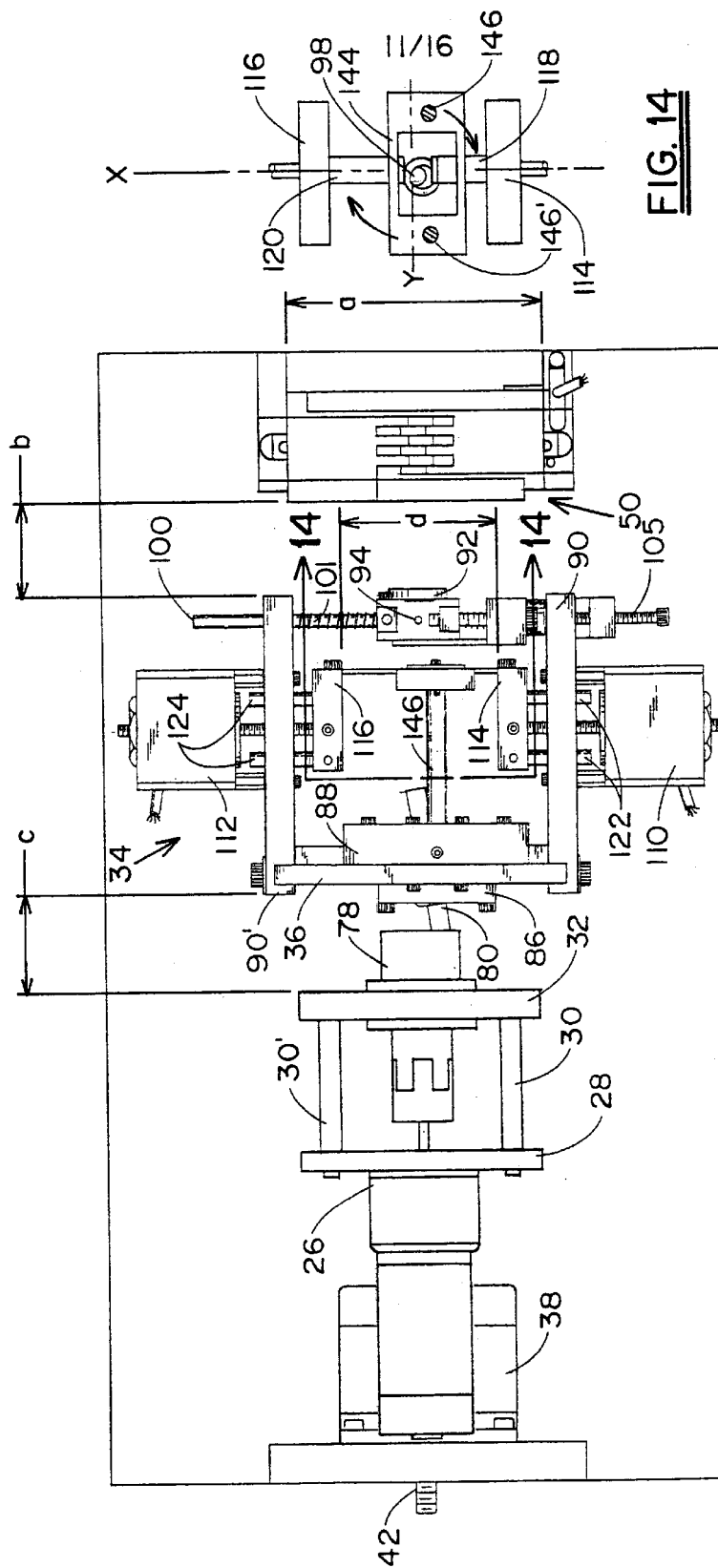

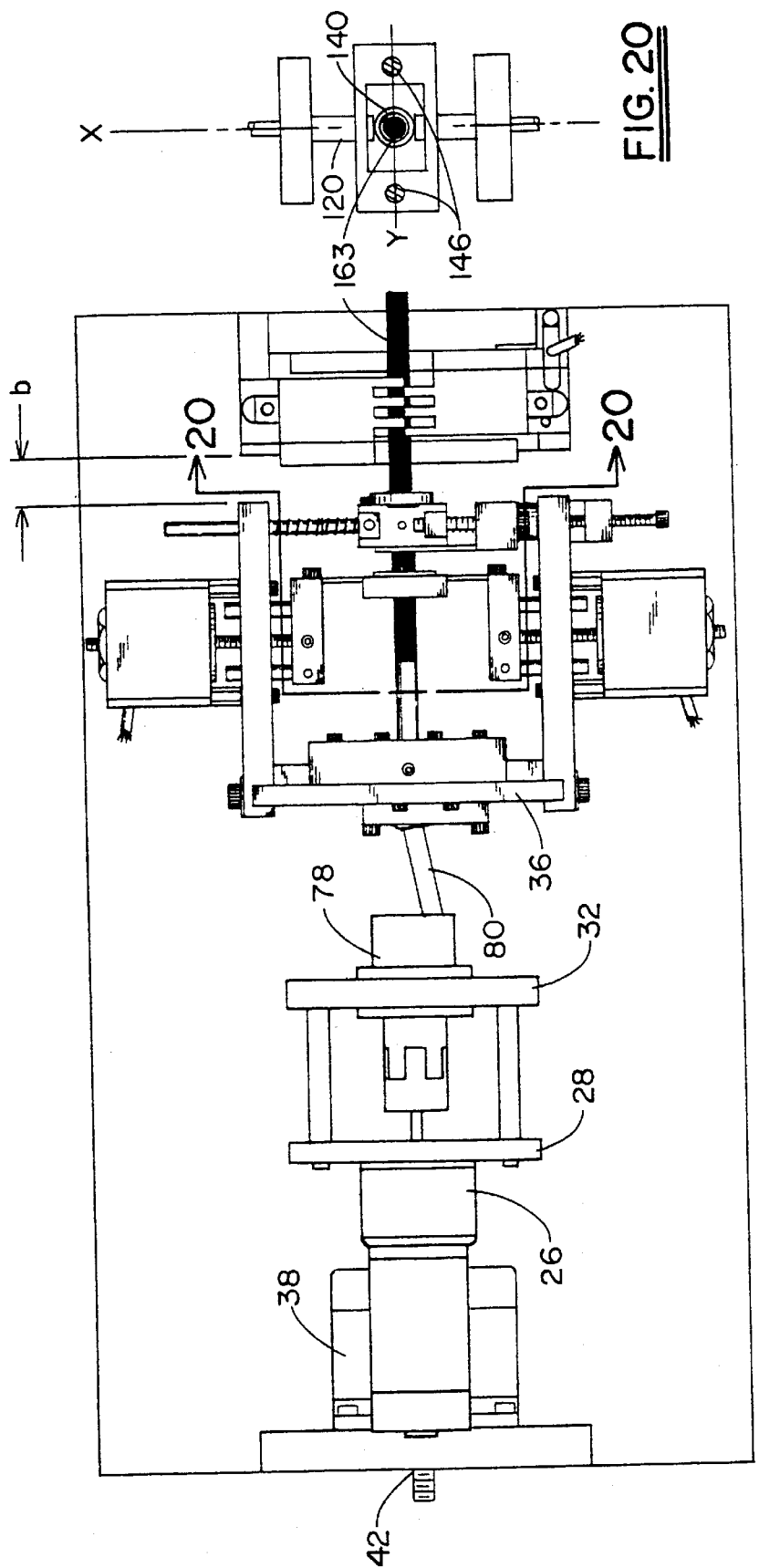

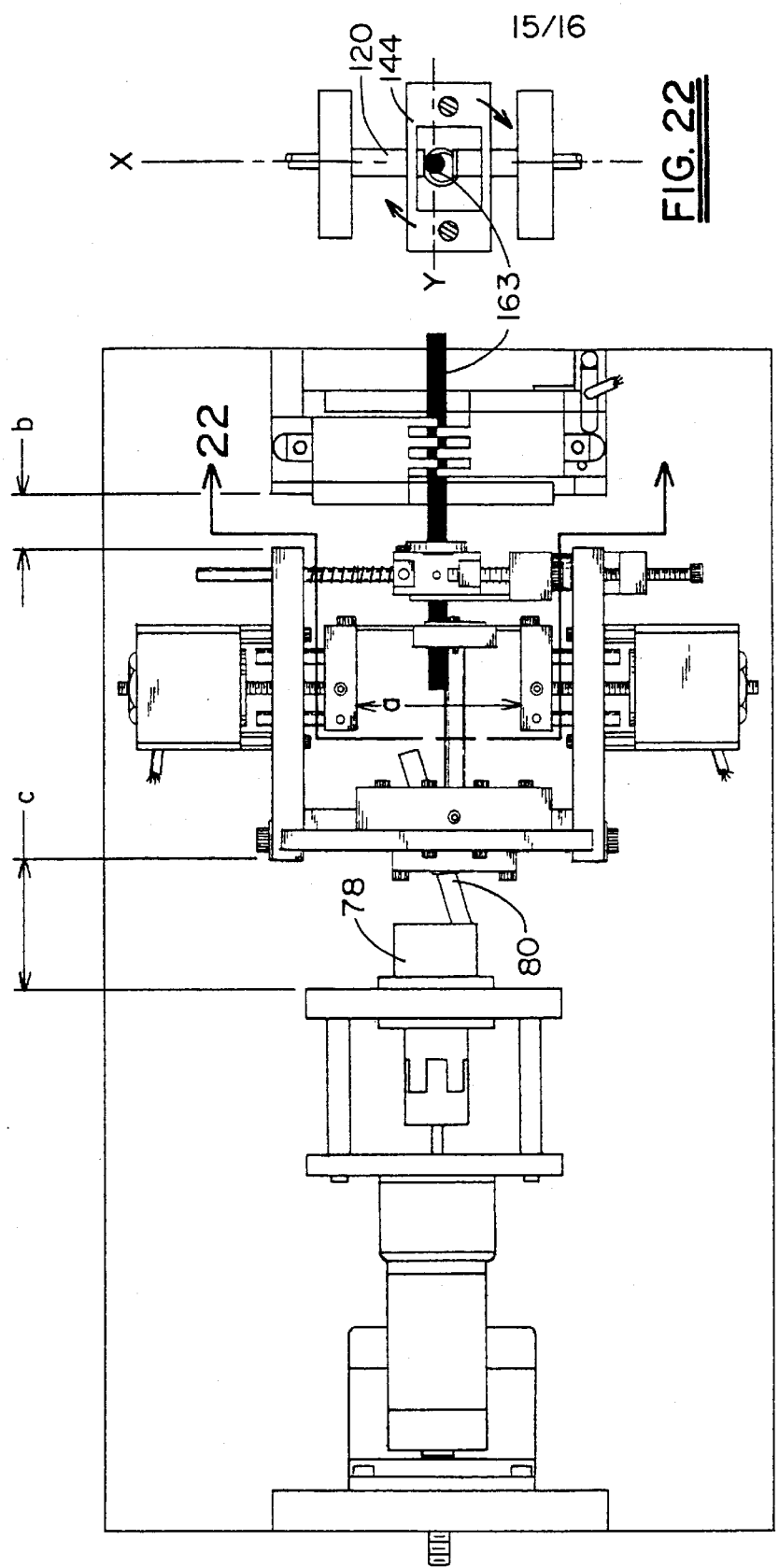

ORBITING BLADE COAXIAL CABLE CUTTER/STRIPPER

CROSS REFERENCE TO RELATED APPLICATION

The present application is a continuation application of Applicant's co-pending U.S. application Ser. No. 09/640,843, filed Aug. 16, 2000, now U.S. Pat. No. 6,588,302.

BACKGROUND OF THE INVENTION

The present invention relates to apparatus for severing multiple layers of coating or covering materials from a central core such as a conductor of a coaxial cable or an optical fiber. More specifically, the invention relates to improvements in automated machinery for sequentially severing and removing multiple layers of material from a wire or other filamentary member utilizing a cutting blade with a circular cutting edge which orbits the material being cut. The prior art includes many types of apparatus for severing and removing a covering layer from a central, filamentary member, as in the removal of insulation and sheathing from an electrical wire or coaxial cable. Such apparatus typically includes one or more cutter blades which are moved from a position spaced radially outwardly from the position at which the cut is to be made inwardly toward the wire, at least partially through the covering layer. The blade(s) may be moved only in linear, reciprocating motion, as in the apparatus of U.S. Pat. No. 5,445,051, or may be rotated about the axis of the wire as they are moved toward and away from the wire, as in the case of U.S. Pat. Nos. 4,745,828 and 4,993,287, or may be moved in a path which orbits the axis of the wire, as disclosed in U. S. Patent No. 4,619,164. Typically, after the covering layer is severed, the severed section or slug is stripped from the wire. While some forms of apparatus are designed to cut and strip only a single layer of material from the central core, making only one cut at the same axial length from the end of the workpiece and at the same radial depth in each workpiece, others are programmable to make a series of cuts, each through a distinct layer of covering material, at different axial positions and different radial depths, as in the case of coaxial cable where several, superposed layers of covering material are required to be cut and stripped from a central conductor. It is with this latter type of apparatus, particularly that of aforementioned Pat. No. 4,6119,164 (hereinafter "the '164 patent"), that the present invention is concerned.

Orbital motion is imparted to one or the other of the cutting and the wire positioning members in the '164 patent by a rod which rotates about the axis of a motor output shaft but which is arranged with its own axis at an acute angle to the motor shaft axis. The rod passes through a bearing mounted in a housing for axial adjustment along the rod to selectively change the radius of the circular, orbiting motion of the blade. The bearing housing is affixed directly to the movable (cutting or wire positioning) member, thereby translating the nutational motion of the rod to orbiting motion of the movable member. Although effective for the intended purpose, the design subjects a number of parts to excessive wear, is not particularly compact, and has a good deal of inherent play and inaccuracy. One of the objects of the present invention is to provide novel and improved means for imparting orbital motion to a movable member in apparatus for cutting a coating layer on a wire, fiber, or the like.

The cutting edge is, of course, circular in orbiting cutter apparatus and thus, at any given time, engages the cut layer over a limited portion of its periphery, i.e., on only one side. Also, for relatively thin layers, the blade engages the cut layer for only a small depth. Stripping of a severed slug is normally accomplished by holding the workpiece axially stationary and moving the blade in a direction removing the slug, or by holding the cutter blade stationary and moving the workpiece axially. Obviously, if the blade engages the slug over a small peripheral portion at a small depth, stripping ability is impaired as compared to apparatus using two blades which engage the slug on both sides. Thus, the use of a single, orbiting cutting edge, as in the '164 patent, has the disadvantage of impaired stripping capability in at least some applications. Another object of the invention is to provide apparatus which improves the stripping function in cutting/stripping apparatus having an orbiting cutting blade.

The prior art apparatus, in respect of features usually associated with both orbiting blade and rotating blade cutting/stripping devices, is improved upon by the present invention in a number of other ways. These include ease of blade replacement, adjustability of the position of the axis of the wire guide, reduction of wire end "whip" during orbital blade movement, better gravity disposal of debris from stripping operation, improved bearing and bushing design in several mechanical areas, an improved centering technique for calibration of movable gripping members, and both mechanical and operational improvements in clamping assemblies.

A preferred embodiment of apparatus fulfilling and embodying the foregoing and other objects and advantages will be summarized, as well as disclosed in detail, in the following sections.

SUMMARY OF THE INVENTION

At what is considered the front end of the apparatus, a pair of clamping jaws are mounted for movement toward and away from one another to fix the axial position of the workpiece during the cutting and stripping operations. Each jaw incorporates a toothed rack engaged with a single pinion gear on the output shaft of a DC motor. The jaws are driven linearly by the motor along a common central axis, providing a simple and reliable mechanical arrangement with a minimum of parts. The motor is controlled by drive electronics which digitally control current through the motor (motor torque) and hence the clamping force. A unique software feature increases the clamping force during the stripping operation, when axial movement of the workpiece is most likely to occur, and returns to the lower value for other functions. The higher and lower clamping forces are user programmable, permitting use of the clamping mechanism with appropriate clamping force over a wide range of cable sizes and other conditions. The mechanism also incorporates novel and improved means for adjusting the horizontal centering position of the jaws.

The workpiece may be, for example, a coaxial cable comprising a central conductor with a plurality of coating or covering layers and, for purposes of the present discussion, will be considered such. The cable is positioned for processing by axial advancement between the clamping jaws and through an opening in a guide bushing with the cutting blade acting as a stop for the end of the cable. Although such guide bushings have been used in prior art cutting/stripping apparatus, such as that of previously mentioned U.S. Patent No. (Mod 76), the bushing is rotated together with the cutting blades about the axis of the stationary wire or cable. In order to avoid excessive generation of heat from friction between guide and workpiece and resulting expansion of the workpiece, it was necessary to provide an appreciable clearance with consequent degradation of centering accuracy. The apparatus of the present invention comprises a guide bushing which is stationary during severing of the covering layer(s), permitting very close clearance between cable and bushing, thereby improving positional accuracy of the cable axis. Furthermore, the apparatus incorporates a unique mechanical arrangement permitting both horizontal and vertical positioning of the structure holding the guide bushing for extremely accurate alignment of the central axes of the bushing and the circular cutting edge. Also, the entire bushing holding and positioning mechanism is movable to expose the cutting blade fully and permit easy and quick replacement thereof. After blade replacement, the bushing and its support structure may be quickly and easily returned to its prior, preset position.

The mounting and motion assembly for the cutting blade includes three plates, namely, a rear plate rigidly connected to the support upon which the blade is mounted, a stationary, center plate, and a front plate. The front plate is connected through horizontally disposed, linear, roller bearings to the center plate for horizontal movement relative thereto. The rear plate is connected, through an opening in the center plate, to the front plate by vertically disposed, linear, roller bearings for vertical movement of the rear plate upon the front plate. Thus, the rear plate is simultaneously movable both vertically (upon the front plate) and horizontally (with the front plate) to provide the desired orbital motion of the blade. The linear bearings are preloaded by adjustment screws, essentially eliminating all play from movement of the plates.

A motor for imparting motion to the rear plate, and thus to the blade is mounted upon a first carriage reciprocally movable upon linear ways on the fixed frame portion of the apparatus. An elongated rod is fixedly attached to the rotatable output shaft of the motor with the axis of the output shaft parallel to the axis of the clamped cable and the axis of the rod at an acute angle to the axis of the output shaft. The rod extends through a prelubricated bearing which is pressed into a spherical bearing mounted on the rear plate. Thus, rotational movement of the output shaft produces what is generally termed nutational motion of the rod and orbital motion of the back plate and blade, except when the back plate is positioned with the center of the spherical bearing at the point of intersection of the axes of the output shaft and the rod where no orbital motion occurs. The blade mounting/motion assembly is mounted upon a second carriage movable upon the same linear ways as the first carriage. A single lead screw extends through the rotatable nuts of a pair of stepper motors, a first mounted upon the fixed frame and a second upon the first carriage; the lead screw also extends through a clearance opening in the first carriage and is fixed to the second carriage. Actuation of the first stepper motor with the nut of the second motor locked moves the lead screw axially, thereby moving both the first and second carriages upon the ways of the fixed frame. This moves the blade axially of the fixed cable, thereby adjusting the distance of the cut from the end of the cable, i.e., the length of cut. Actuating the second stepper motor with the nut of the first motor locked moves the first carriage with respect to the second, thereby changing the axial position of the rod which intersects the center of the spherical bearing and consequently the radius of orbit of the blade, i.e., the depth of cut.

A pair of so-called gripper members are positioned on horizontally opposite sides of the cable near the plane of the blade cutting edge. Each gripper member includes an arm with an edge portion. Respective stepper motors move the edge portions toward and away from one another at equal distances from the axis of the cable. The user may program the device to actuate the stepper motors to move the arms inwardly until the edge portions engage the outermost layer of the cable either before or after the blade has been moved to sever the layer. Engagement of the edge portions of the gripper members reduces the tendency of the portion of the cable extending past the blade to "whip" during the cutting operation. In any case, after the slug is severed from the remainder of the outermost layer of the cable, engagement of the gripper members with the slug, coupled with rearward movement of the carriages, causes the slug to be stripped from the cable and fall by gravity to a disposal position clear of any moving parts of the apparatus. Furthermore, the slug is also engaged by the blade, resulting in three-point contact (the blade and the edge portions of the two gripper member arms) with the slug for enhanced stripping action.

The features of construction and operation of the apparatus outlined above will be more readily understood and fully appreciated from the following detailed disclosure, taken in conjunction with the accompanying drawings.

BRIEF DESCRIPTION OF THE DRAWINGS

FIG. 1 is a partially diagrammatic, perspective view of a preferred embodiment of the invention;

FIG. 2 is a top plan view of the apparatus of FIG. 1;

FIG. 2a is a fragmentary, top plan view, partly in section, of portions of the apparatus within the circled area of FIG. 2 denoted "FIG. 2a"

FIG. 2b is a front elevational view on the line 2b—2b of FIG. 2a;

FIGS. 4 and 5 are front and rear end elevational views, respectively;

FIG. 6 is a fragmentary, rear elevational view of a portion of the apparatus taken on the line 6—6 of FIG. 2;

FIG. 7 is a front elevational view taken on the line 7—7 of FIG. 2;

FIG. 7a is a front elevational view, as seen in FIG. 7, with certain elements shown in an alternative position;

FIG. 8 is a side elevational view of the assembly of FIG. 7 with portions shown in phantom lines in the alternative position of FIG. 7a;

FIG. 9 is a perspective view of a special element used in calibration of certain portions of the apparatus;

FIG. 10 is a front elevational view in section on the line 10—10 of FIG. 2;

FIGS. 11 and 12 are top plan and side elvational views, respectively, with portions broken away, of the elements of FIG. 10;

FIGS. 11a and 12a are elevational views in section on the lines 11a—11a and 12a—12a, respectively, of FIGS. 11 and 12; and FIGS. 13 through 24 are a series of views illustrating relative positions of certain movable elements of the apparatus at consecutive stages in the processing of a cable, the odd numbered Figures being top plan views and the even numbered Figures being fragmentary, elevational views taken on the lines indicated by the number of the even numbered Figure on the next preceding odd numbered Figure.

DETAILED DESCRIPTION

Figure 1A:
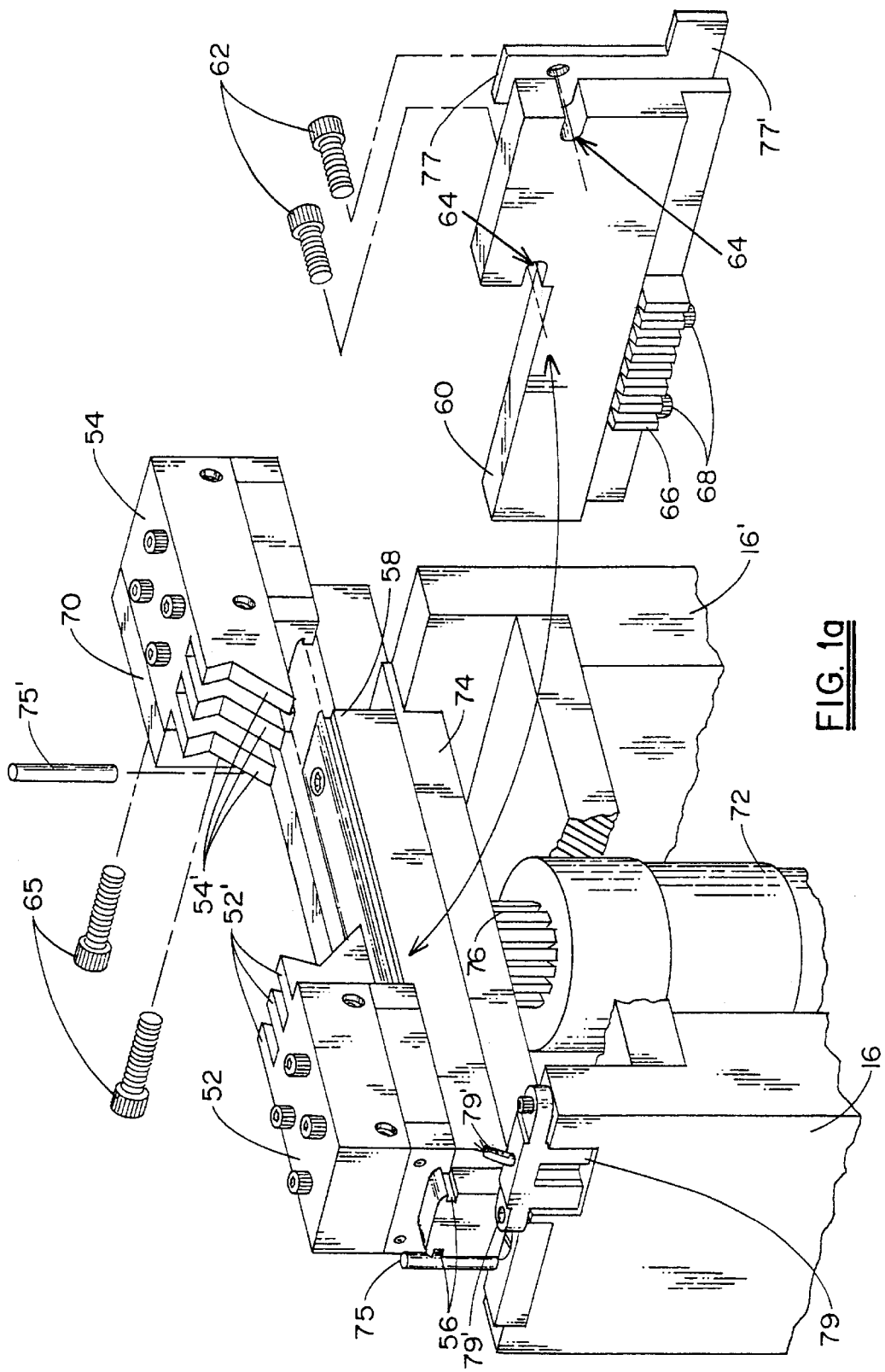
FIG. 1a is a partially exploded, perspective view of the portions of the apparatus within the circled area of FIG. 1 denoted "FIG. 1a"
Figure 3:
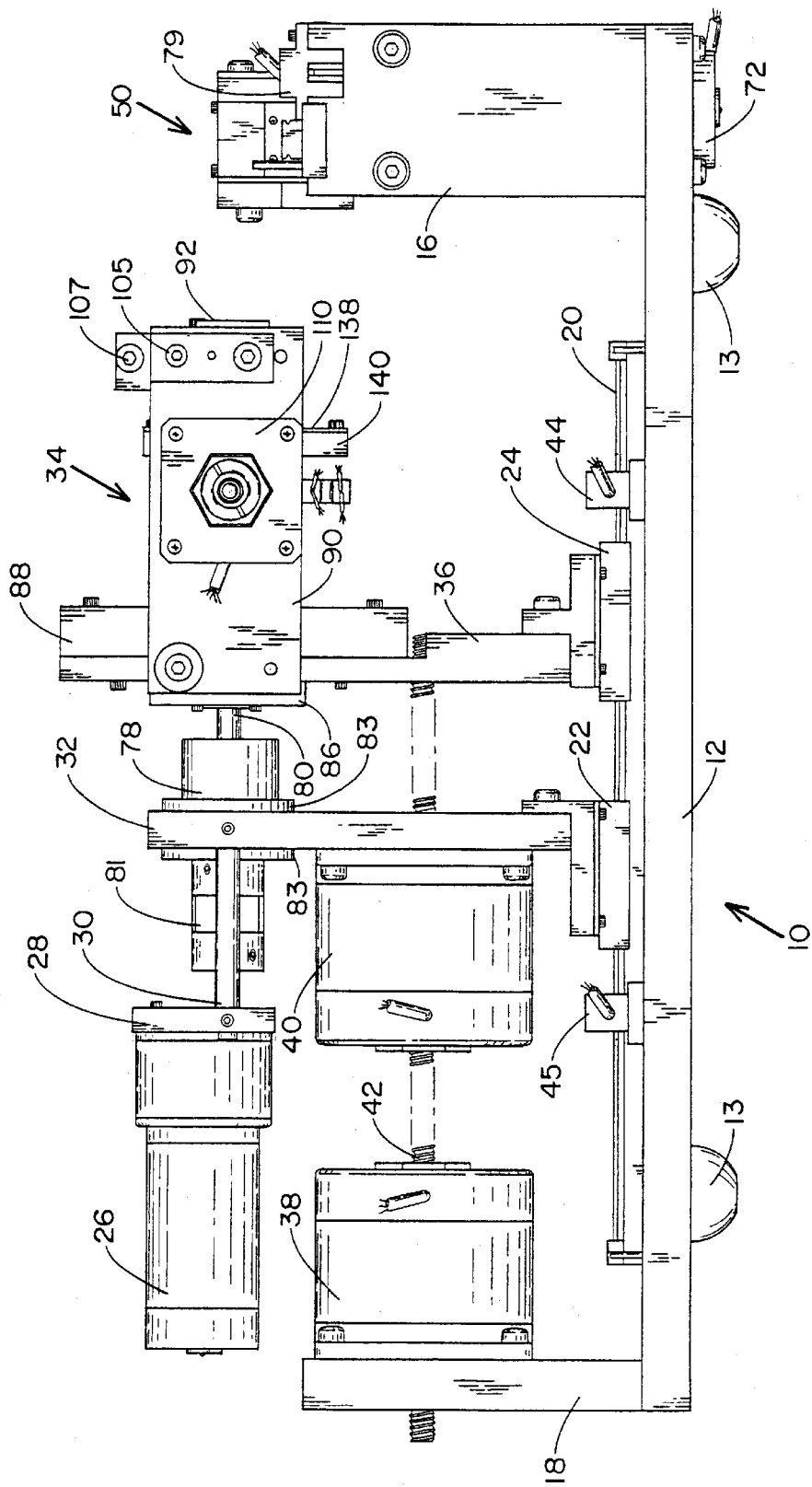
FIG. 3 is a side elevational view of the apparatus.
Figure 4:
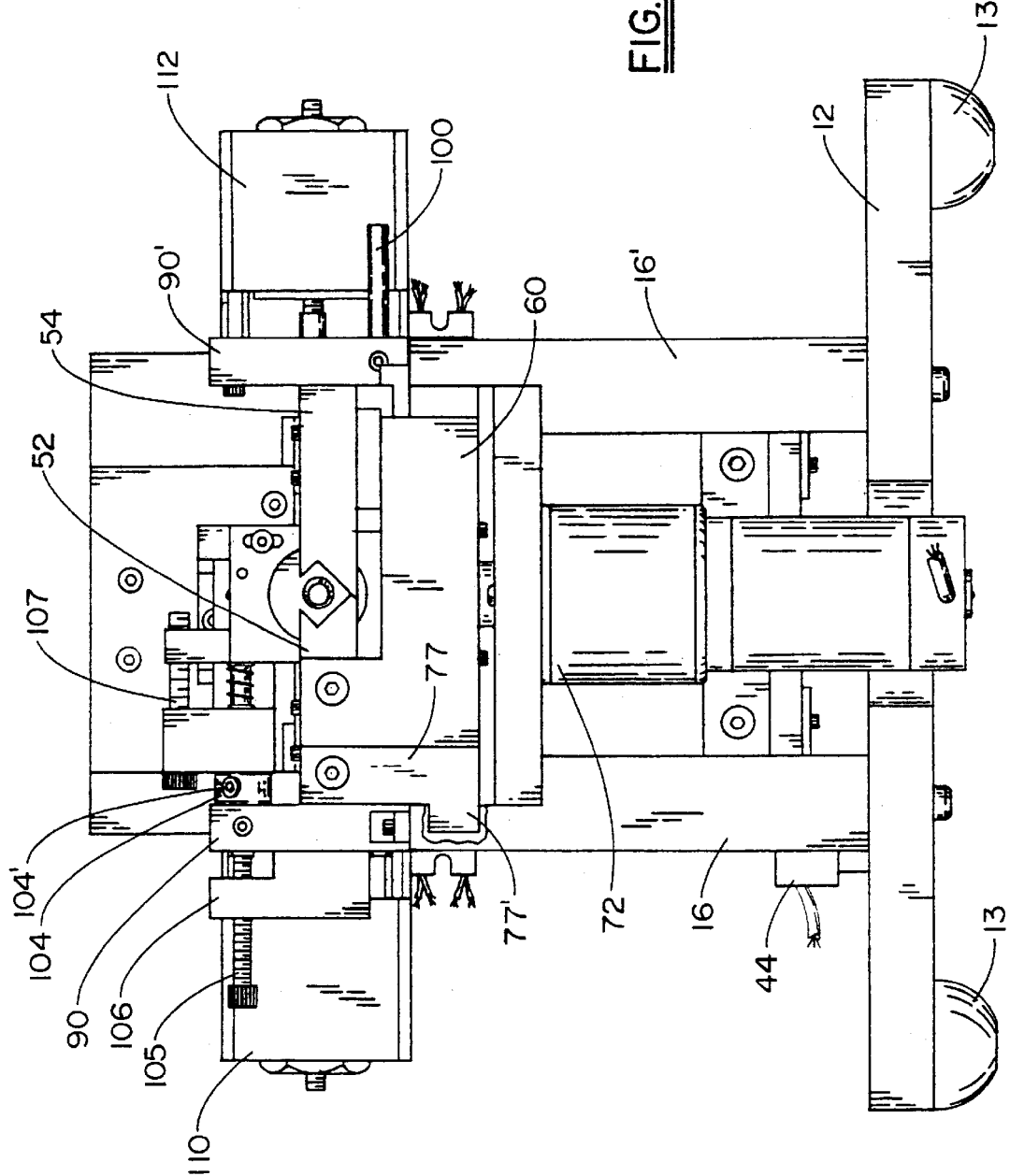

The apparatus of the invention, in the illustrated embodiment, is denoted generally by reference numeral 10. Apparatus 10 would, of course, be enclosed in an appropriate housing to prevent manual contact with moving parts, provide for insertion and withdrawal of workpieces, scrap removal, etc. However, since the design of the housing plays no part in the present invention, it is omitted from the drawings. The fixed frame of the apparatus includes horizontal 12, resting on feet 13 and having open, cutout area 14 at what is considered the front end of the apparatus, front, vertical supports 16, 16' on opposite sides of open area 14, and rear, vertical support 18. Guide ways 20 are fixedly attached to the upper surface of plate 12 for sliding engagement by first and second carriages 22 and 24, respectively. For optimum rigidity and stability, the carriages are mounted to the ways via recirculating, linear, ball bearings pre-loaded to essentially remove play. DC motor 26 is mounted, via plate 28 and rods 30, 30', upon vertical support plate 32 for horizontal, reciprocating movement with first carriage 22.

Assembly 34, including the mounting and motion transmission elements for the cutting blade, gripper members, cable guide bushing and other elements described later, is mounted upon vertical support 36 of second carriage 24 for movement therewith. Stepper motors 38 and 40 are fixedly mounted to support 18 of the fixed frame and support 32 of the first carriage, respectively. Lead screw 42 is threadedly engaged with the rotatable nuts of motors 38 and 40 and with a threaded opening in support 36, and extends with clearance through openings in supports 18 and 32. Optical switches 44 and 45 are fixedly mounted to plate 12, for purposes described later. Electrical power and control boxes are diagrammatically represented in FIG. 1 by boxes 46 and 48, respectively, for operation and control of the automated functions of apparatus 10, as described hereinafter.

Clamping jaw assembly 50, elements of which are shown in more detail in FIG. 1a, is mounted upon fixed supports 16, 16' at the front end of apparatus 10. Jaws 52 and 54 each have a plurality of V-shaped engagement faces 52' and 54', respectively. The bases of the two jaws include inwardly facing tracks for sliding engagement with grooves 56 on the same fixed support 58. Plate 60, shown rotated away from its normal position, is adjustably fixed to the front side of jaw 52 by Allen-head screws 62 extending through open-ended slots 64. Plate 60 carries a linear gear rack comprising teeth 66, affixed to plate 60 by screws 68. Plate 70 is adjustably affixed to jaw 54 by screws 65 in the same manner as plate 60 with respect to jaw 52 and carries a gear rack with teeth (not shown) identical to teeth 66. DC motor 72, supported on plate 74 between fixed frame supports 16, 16' is actuable to rotate pinion gear 76 in opposite directions. Teeth 66 of plate 60 and the corresponding teeth of plate 70 are engaged with front and rear sides, respectively, of pinion 76 for reciprocating, linear movement of jaws 52 and 54 toward and away one another to engage and release a cable placed between engagement faces 52' and 54'. The outer limits of movement of jaws 52 and 54 are constrained by pins 75, 75'. Plate 77, having leg 77', is mounted by one of screws 62 on the front side of plate 60. Optical switch 79, of a conventional type having spaced beam and detector elements, is mounted on support 16 and connected to the microprocessor by wires 79'. As jaws 52 and 54 are moved to their outer positions, leg 77' interrupts the beam of switch 79, electronically confirming movement of the clamping jaws. As explained later, the radial position of the cable axis is established and maintained relative to the cutting blade by a guide bushing close to the blade, but it is desirable to calibrate the positions of jaws 52 and 54 relative to a desired radial position of the central axis of a cable clamped therebetween, at least approximately. This operation is quickly and easily performed by loosening screws 62 and 65, placing a metal rod at the desired centering position between engagement faces 52' and 54' and manually pushing jaws 52 and 54 toward one another, without movement of plates 60 and 70 until the engagement faces contact the rod The rod may be centered by being inserted in the cable guide bushing, or by other means. Screws 62 and 65 are then tightened, engaging the racks on plates 60 and 70 with pinion 76 with the jaws centered to acceptable accuracy.

Cylindrical member 78 is considered the output shaft of motor 26, being connected directly to the motor by resilient coupling 81 (or by a timing belt) and extending through double-row ball bearing 83. Elongated rod 80 is fixedly attached at one end to shaft 78, as by force fit in a cavity in the end of the shaft, at a position offset from the central axis of shaft 78, and extends to free end 80'. The axis of rod 80 is at an acute angle (indicated in FIG. 2 as angle "a") to the central axis of shaft 78 and the two axes intersect at a point forwardly of the end of shaft 78 (indicated in FIG. 2 as point "X"). Rod 80 extends through pre-lubricated bearing 85, pressed into spherical bearing 82, captured in bearing holder 84 which in turn is mounted in plate 86, as best seen in FIG. 2a. A forward portion of plate 86 extends through an opening in plate 36 and is mounted to plate 88, which in turn is mounted to plate 36, in a manner described later. Actuation of motor 26 to rotate output shaft 78 produces nutational motion of rod 80 with points along the central axis of rod 80 orbiting the central axis of shaft 78 except at the point of intersection of the axes of shaft 78 and rod 80 (point X). The radius of the orbital path is in direct to the distance, forwardly or rearwardly, from point X to any given point on the rod axis. Further details of the structure and interconnection of the elements associated with transfer of motion from motor 26 to the cutting blade will be provided later herein.

Other portions of assembly 34 are carried by arms 90, 90', affixed to and extending forwardly from plate 36. One such portion, a subassembly concerned with establishing and maintaining the radial position of the cable axis accurately centered with respect to the cutting blade is best seen in FIGS. 6–8. Guide bushing 92 is removably retained by set screw 94 in bushing holder 96 which is supported for vertical, sliding motion upon bushing holder support 97. As the first step in a cable processing operation, the end of the cable to be processed is advanced axially between jaws 52 and 54 and through central opening 98 of bushing 92. The bushing and cable do not rotate relative to one another during processing, thus eliminating any heating and expansion of the cable due to friction. This makes possible the use of bushings having openings with a diameter as little as 0.002" greater than that of the cable being processed with corresponding improvement in centering of the cable axis relative to the orbital axis of the blade.

Other advantageous features of the guide bushing arrangement are evident in the illustrations of FIGS. 2 and 6–8. Included among these are a design permitting movement of the guide bushing and its related mounting structure between an operative position with the guide bushing positioned close to the cutter blade and an inoperative position providing full access to the front of the blade, as well as structure permitting limited adjusting movement in both horizontal and vertical directions of the radial position of the guide bushing axis for precise centering thereof relative to the blade cutting edge axis. Rod 100 extends through and is axially restrained in openings in arms 90 and 90', and extends slidingly through a passageway in bushing holder support 97. Spring 101 is installed on rod 100 between arm 90' and support 97 to bias the latter toward the left, as seen in FIG. 7. Rod 102 is fixedly secured at one end to support 97 and extends loosely through an opening in bracket 103 and into an opening in arm 90. Collar 104 is installed on rod 102 between bracket and arm 90 and adjustably fixed in a desired axial position by set screw 104'. Collar 104 provides a stop against arm 90, defining the limit of movement due to the biasing force of spring 101.

Adjustment screw 105 extends threadedly through an opening in bracket 106 which is affixed to arm 90, and the end of the screw engages the end of rod 102 for axial movement thereof in response to rotation of screw 105. Adjustment screw 107 extends loosely through an opening in bracket 103 and is threaded through an opening in projecting portion 97' of bushing holder support 97. It will be noted in FIG. 6 that bracket 103 has at one end slot 103' extending angularly between horizontal and vertical. Pin 96' extends rearwardly from guide bushing holder 96 through slot 103'. Spring 108 (FIG. 7) is installed around rod 102 and biases bracket 103 into contact with the head of screw 107. Bushing holder 96 and support 97 may be manually moved to the right, as seen in FIG. 7, against the bias of spring 101, sliding on rod 100. Rod 102, bracket 103, collar 104 and adjustment screw 107 will move, together with the bushing, holder and support, until rod 102 is fully removed from the opening in arm 90. All of the moved elements may then be rotated about rod 100 in the direction of arrow 109 to the inoperative position shown in FIG. 7a and in phantom lines in FIG. 8. This provides full, unobstructed access to the cutting blade for removal and replacement thereof. Spring 101 biases the rotated elements to the left in the inoperative position and, when returned to the operative position, all elements will be in their original positions due to contact of collar 104, acting as a stop defining the limit of leftward movement, with arm 90.

The arrangement also permits adjustment of the radial position of the guide bushing axis in both the X (horizontal) and Y (vertical) directions over the limited ranges indicated in FIG. 7. Rotation of adjustment screws 105 and 107, as indicated by the arrows in FIG. 8, together with the action of springs 101 and 108, will result in movement of the bushing axis in the X and Y directions, respectively. Rotation of screw 107 causes horizontal movement of bracket 103 which translates, through angled slot 103' and pin 96', to vertical movement of bushing holder 96, sliding in support 97. Locating the ideal position of the axis may be performed by manually rotating shaft 68 while looking through bushing opening 98. The position of the axis is adjusted to make the orbital path of the blade opening visually concentric with the central axis of the bushing opening. A cable is then inserted through the bushing, the outer layer is cut and stripped, and the cable is removed and visually inspected for concentricity of cut. Any necessary fine adjustment of the position of the bushing axis may then be made. Although extremely accurate positioning may be obtained by automated means, for example, opto-electronic means with positional feedback, the described manual adjustments with "eyeballling" of relative positions of bushing and blade axes together with "trial-and-error" cuts, provide acceptable calibration for virtually all applications.

Stepper motors 110 and 112 are mounted on the outside of arms 90 and 90', respectively. Lead screws 110' and 112' are threadedly engaged with the rotatable nuts of stepper motors 110 and 112, respectively, and extend rotatably through openings in arms 90 and 90'. Blocks 114 and 116 are carried on the ends of lead screws 110' and 112', respectively. Gripper members 118 and 120 are mounted upon blocks 114 and 116, respectively. Stepper motors 110 and 112 are actuated to move lead screws 110' and 112' axially in opposite directions, thereby moving the opposed edges of gripper members 118 and 120 toward and away from one another. Reciprocal, linear motion of blocks 114 and 116 is established by sliding movement of rods 122 and 124 (FIG. 2) on the blocks moving slidingly through openings in arms 90 and 90', respectively.

Precise calibration of gripper members 118 and 120 to position the opposed edges thereof at equal distances from the axis of opening 98 in bushing 92, and thus equal distances from the central axis of a cable extending through the bushing opening, is provided by a unique combination of hardware and software. For this purpose, special bushing 126, shown in FIG. 9, is positioned in holder 96. This operation is carried out with the blade removed. Bushing 126 has no opening for passage of a cable, but rather a metal center pin 128, extending past the normal blade position and the plane of the opposed edges of gripping members 118 and 120. Pin 128 is electrically insulated by plastic body 130 from metal strip 132 which is connected to chassis ground by contact with set screw 94. Pin 128 and strip 132 are connected by wires 134 and 136, respectively, to an input port 137 of a microprocessor forming part of control box 48 (FIG. 1). One of stepper motors 110 and 112 is actuated in a step-by-step manner until the edge of the metal gripping member moved thereby touches pin 128, at which point pin 128 is also connected to ground potential, causing the microprocessor to note (store) the position of the gripping member, in terms of the number of motor steps from the central axis of the pin. The first gripping member is then moved away from pin 128 and the same steps are repeated for the other stepper motor and gripping member. One or both stepper motors are actuated as required to the opposing edges of the gripping members at equal distances (an equal number of steps of their respective stepper motors) from the central axis. This calibration technique is much easier and more reliable than prior art, mechanical calibration procedures. It is useful to note that rods 146, 146' extend through blade holder 144 and terminate a short distance forwardly of the front surface of the holder. A pair of holes in blade 138 are provided above and below the opening defined by cutting edge 140 for passage of rods 146, 146'. The three holes in the blade are ground to quite precise tolerances and serve to position each blade mounted upon holder 144 with great accuracy and repeatability relative to both the holder and also to orbitally movable plate 86.

Figure 12:
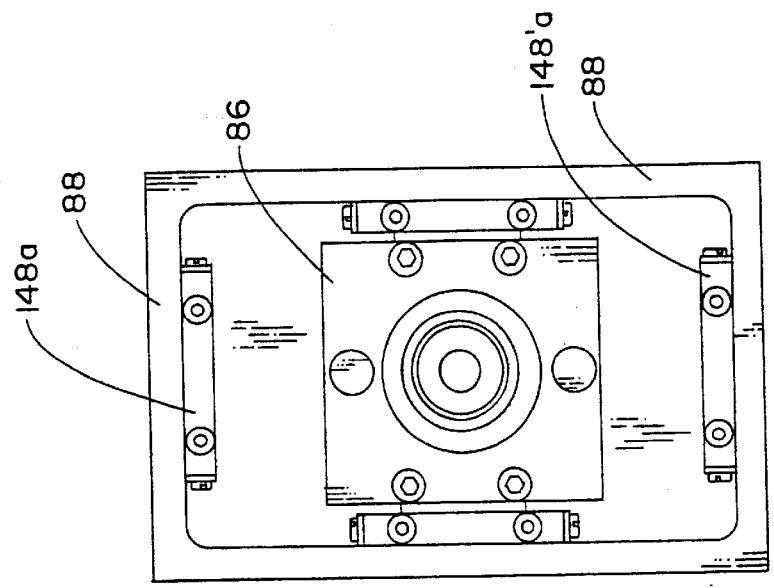
Figure 11A:
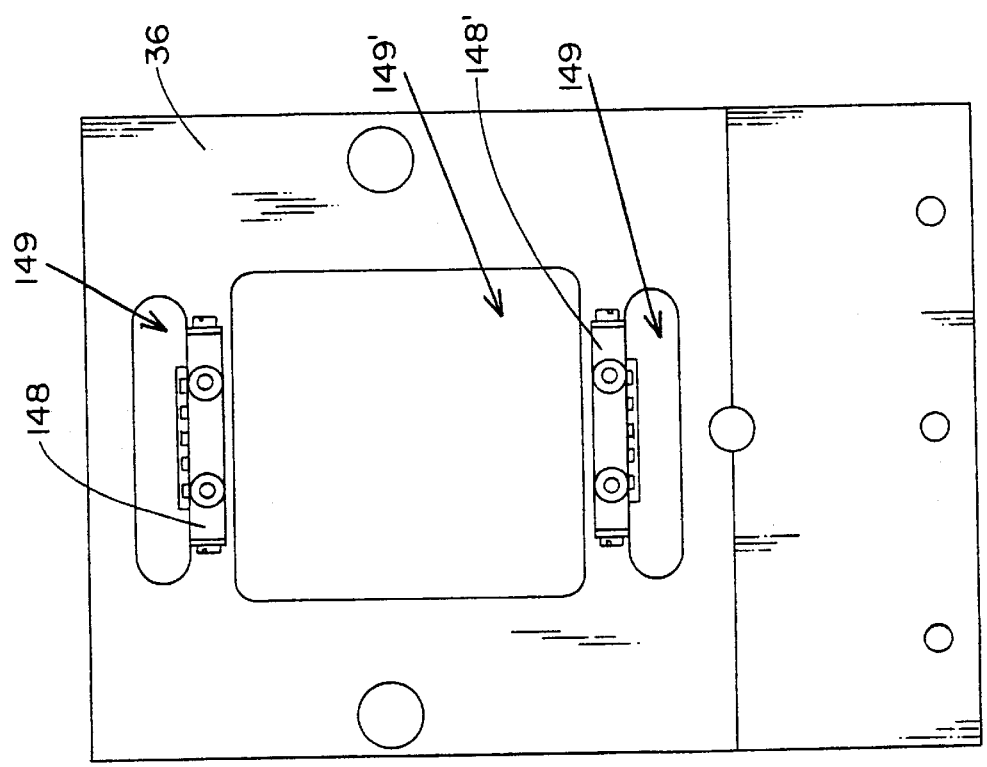

Referring now to FIGS. 10, 11, 11a, 12 and 12a, the elements for mounting and moving the cutting blade will be explained in greater detail. Blade 138, having circular cutting edge 140, is mounted by screws 142, 142' upon blade holder 144. A pair of rods 146, 146' rigidly connect holder 144 to plate 86 for direct transmission of the previously described, orbiting motion of plate 86 to holder 144 and thus to blade 138. The orbiting motion is in planes perpendicular to the axis of the cable being processed, and thus in the plane of cutting edge 140. Plate 88 is mounted upon support plate 36 for horizontal movement relative thereto upon a first set of linear roller bearings or so-called rail sets. In this type of bearing, first and second halves of the bearing housing are mounted to the respective movable members. The housing halves are locked together by the bearings themselves so that the members cannot be separated but are relatively movable in the direction of the row of bearings. Housing halves 148 and 148' are seen in FIG. 11*a*, mounted upon plate 36. The complementary halves 148*a* and 148'*a* are seen in FIG. 12*a*, mounted upon plate 88. Open slots 149 in plate 36 are provided to facilitate assembly of plates 36 and 88. Plates 86 and 88 are mutually connected, through opening 149' in plate 36, for vertical movement relative to one another through slide sets comprising linear roller bearings in housings 150, 150' on plate 88 and complementary housings mounted by screws 150*a* (FIG. 2*b*) and 150*a'* on plate 86.

Referring again to FIG. 2*b*, rods 146, 146' are seen to extend from plate 86 through diametrically opposite, elongated slots 152, 152' which communicate with central opening 154 in plate 88 through which rod 80 extends. Thus, the vertical component of the motion of rod 80 is transmitted directly to plate 86, moving it vertically with respect to plate 88 upon bearings 150, 150' and moving rods 146, 146' vertically in slots 152, 152', respectively. The horizontal component of the motion of rod 80 is transmitted to both plates 86 and 88, moving the latter horizontally upon bearings 148, 148' relative to plate 36. The resulting orbiting movement of plate 86, rods 146, 146', holder 144 and blade 138 is a combination of the horizontal and vertical components of the nutational motion of rod 80, transmitted through the slide plates and bearings in the manner indicated. The use of crossed, linear, roller bearings in the mechanical motion transmission arrangement of apparatus 34 provides the important advantages of a more compact design, fewer wear parts, elimination of play by pre-loading of linear bearings with smoother, more accurate and rigid motion.

Figures 15, 16:
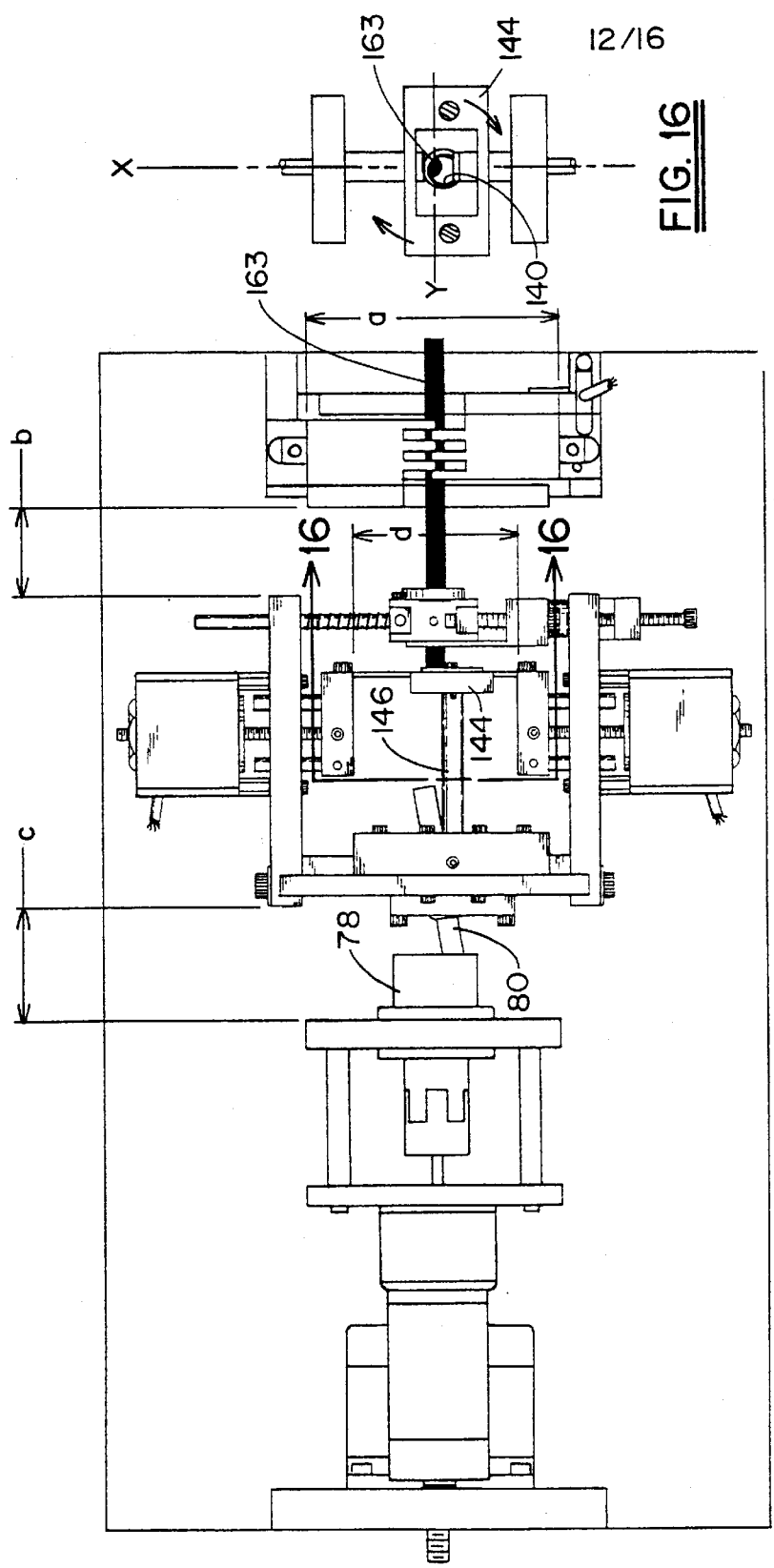

Referring now to the remaining Figures, i.e., FIGS. 13 through 24, the sequence of steps performed by apparatus 10 in cutting and stripping the outer layer from a coaxial cable having a plurality of layers in concentrically surrounding relation to a central conductor will be described. Prior to inserting the cable into the apparatus, the operator provides inputs through keypad 162 (FIG. 1) to the microprocessor of control box 48. LCD display 164 is also shown diagrammatically in FIG. 1, providing visual readout of the data inserted by the operator. The selective inputs include numerical values corresponding to the radial depth and axial length of each cut to be made, and may include other instructions, as explained later. The "ready" or "home" position of the movable elements, prior to insertion of the workpiece, is illustrated in FIGS. 13 and 14. The elements are in this position at the conclusion of each cable processing operation, and thus at the beginning of the next operation, when apparatus 10 is powered up. The jaws of clamping assembly 50 are in the open or separated position with the outer surfaces spaced by distance a; carriages 22 and 24 are positioned at the forward and rearward ends of their travel, respectively, with the forward ends of arms 90, 90' spaced from the opposing surface of the clamping assembly by distance b, and the forward surface of plate 32 spaced by distance c from the rear ends of arms 90, 90'; blocks 114 and 116 are in their outermost positions, spaced by distance d. This home position of the elements is pre-programmed into the microprocessor and is not under control of the operator performing the cable processing. After completing the keypad operations, the cable is manually advanced by the operator between the clamping jaws and the opening in the guide bushing until the end of the cable abuts the cutting blade (it will noted that the blade opening surrounded by the cutting edge is not axially aligned with the guide bushing opening in the home position of the elements). The operator then presses the "start" button or pad and sequential steps proceed under control of the microprocessor, as follows:

Step 1: Reference FIGS. 15 and 16. The cable, shown as a solid black line denoted by reference number 163, has been inserted and motor 72 has been actuated to move the clamping jaws into contact with the cable. Although a portion of the end of the cable is seen in FIG. 16, the offset axes of guide bushing 92 and cutting edge 140 cause at least a portion of the cable end to abut the forward surface of blade 138. Other elements remain in the home position. One of the instructional inputs (i.e., other than the numerical inputs indicating depths and lengths of cuts) into keypad 162 is the clamping force exerted on cable 163. This is a function of motor torque which is directly proportional to the current supplied to the motor. Thus, if the same current is applied the clamping force will be the same regardless of cable diameter. As a further refinement, the magnitude of the current may be varied at certain times in the cutting and stripping operation. Since very little axial force is applied to the cable except when the slug is being pulled away, current may be kept at a low level at all times other than during stripping, at which time it is increased to hold the cable more firmly, and returned to the lower value thereafter. This feature effectively prevents motor overheating and prolongs motor life.

Figures 17, 18:
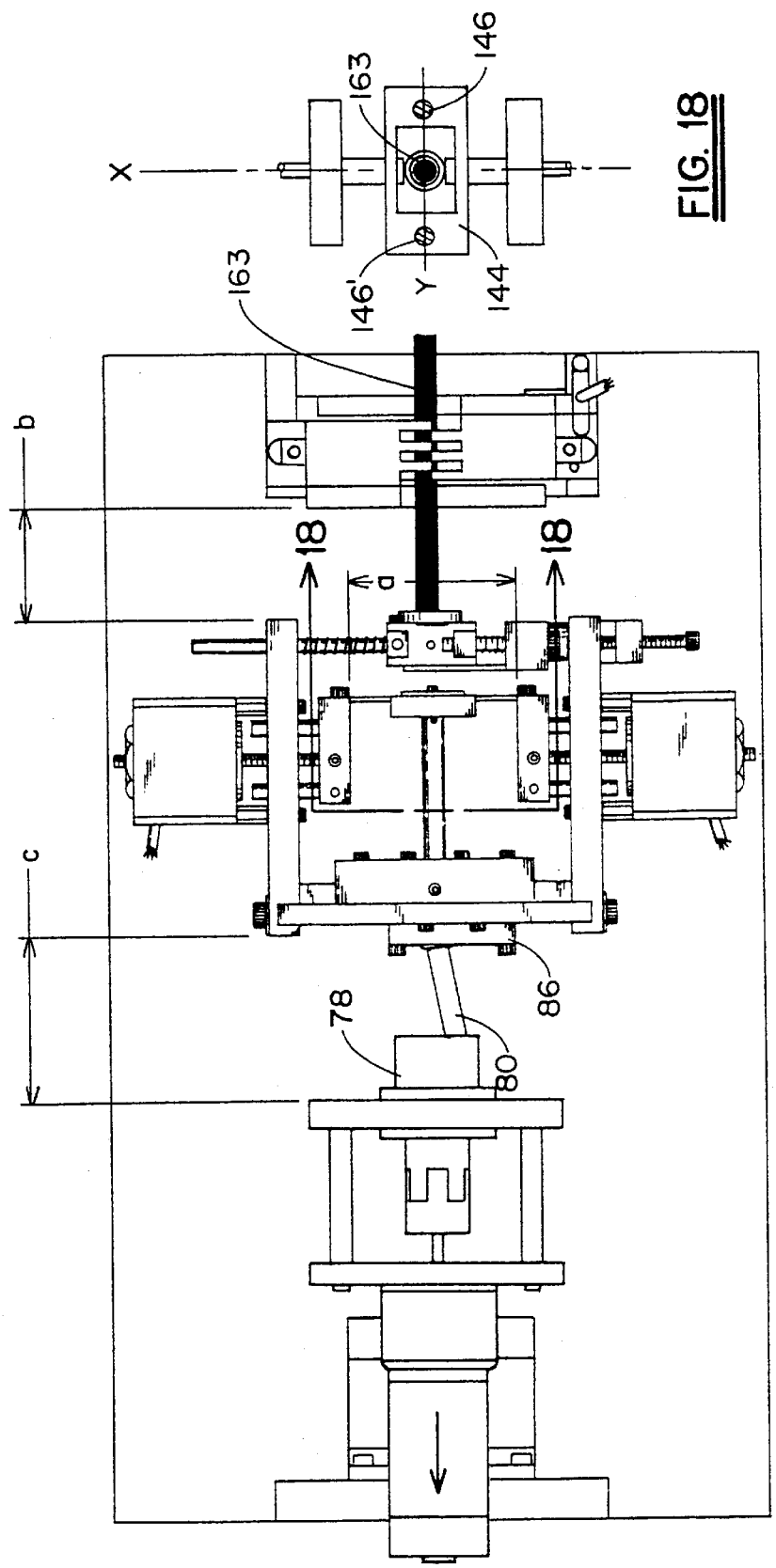
Figures 23, 24:
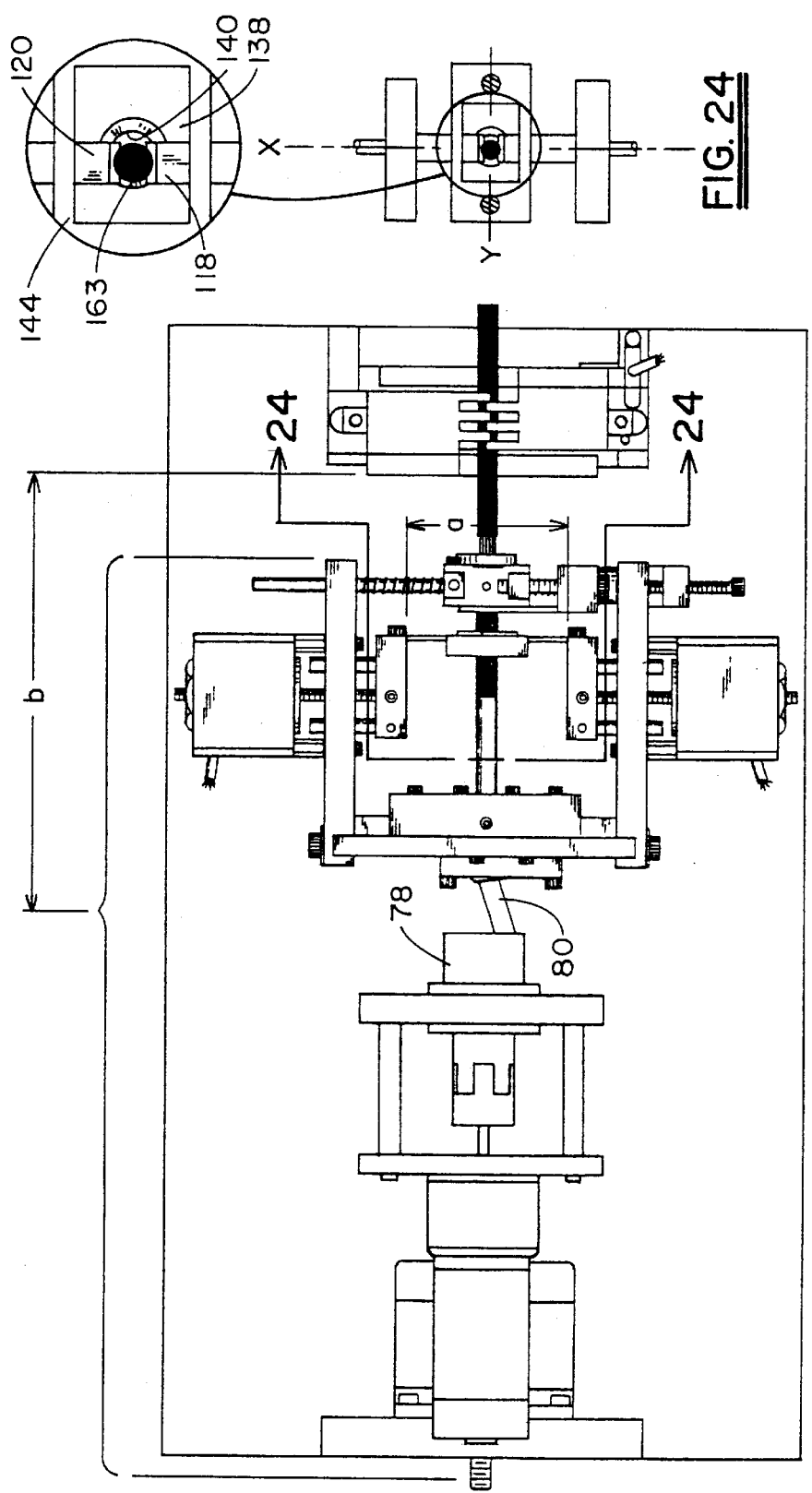

Step 2: Reference FIGS. 17 and 18. Stepper motor 40 is actuated while stepper motor 38 is not, i.e., the nut of stepper motor 38, which is anchored to the fixed frame, is locked while the nut of motor 40 is rotated. Lead screw 42 remains stationary while stepper motor 40 and carriage 22 move rearwardly, thereby increasing reference distance c. Rod 80 is pulled rearwardly through bearing 82, shifting the position of plate 86. The number of steps motor 40 is actuated during this step is the same for each operation, being the number of steps necessary to move plate 86, and thus rods 146, 146', blade holder 144 and blade 138, to a position wherein the blade opening surrounded by cutting edge 140 is concentric with the axis of cable 163, as seen in FIG. 18.

Step 3: Reference FIGS. 19 and 20. Stepper motor 38 is actuated while stepper motor 40 is not, i.e., the nut of stepper motor 40, which is mounted to plate 32 of first carriage 22, is while the nut of motor 38 is rotated. Since motor 38 is mounted to the fixed frame, lead screw 42 is moved axially forward, moving carriages 22 and 24 in a forward direction together with all the elements carried thereon. This advances the blade axially with respect to the end of the stationary cable, reducing reference dimension b with cable 163 extending concentrically through the blade opening. The number of steps for which motor 38 is actuated is the number necessary to position the plane of the blade cutting edge at a distance from the free end of the cable corresponding to the axial length of the first cut.

Step 4: Reference FIGS. 21 and 22. Motor 26 is actuated to rotate output shaft 78 and rod 80, thus producing the previously described orbiting motion of plate 86. Blade 138 orbits cable 163, as indicated in FIG. 22. The radius of orbital motion, as determined by reference distance c, i.e., the position along its axis at which rod 80 engages bearing 82, produces a depth of cut equal to the thickness of the outer layer of cable 163, as programmed into the microprocessor by the operator.

Step 5: Reference FIGS. 23 and 24. Motor 26 is deactuated, stopping orbital motion of blade 138. Stepper motors 110 and 112 are actuated to move gripping members 118 and 120, respectively, toward one another until opposing edges of the gripping members engage the outer layer of cable 163 at a position very close (a slight distance toward the rear of apparatus 10) to that at which the outer layer has been severed by cutting edge 140. The number of steps for which motors 110 and 112 are actuated is determined by the microprocessor in accordance with cable diameter and depth of cut information which is inserted by the operator prior to commencing processing of the cable. As seen in the enlarged portion of FIG. 24, the outer layer of cable 163 is engaged by blade 138 at a position adjacent the cutting edge indicated by reference numeral 140', and the slug (the portion of the outer layer between the cut and the terminal end) is engaged on opposite sides by opposing edges of gripping members. Thus, for stripping purposes, the slug is engaged at three points about its periphery. Current to motor 72 is increased to raise the clamping force exerted on the cable, as previously described. Stepper motor 38 is then actuated, moving lead screw 42 axially rearwardly, together with carriages 22 and 24. This movement, with cable 163 restrained against axial movement by clamping assembly 50, removes the slug from the remaining portion of the cable. The slug may fall by gravity, free of any moving parts since the stripping operation is performed at a position axially offset (forwardly) from the orbital drive components. Commercially available covers may be provided on the forward portion of ways 20 to insure that no debris in deposited thereon. The current to motor 72 is decreased to its original level and stepper motors 110 and 112 are actuated to move gripping members 118 and 120 back to their outward positions.

Step 6: Reference FIGS. 13 and 14. Following the stripping operation, the elements are returned to the home position, ready for movement through another series of steps to cut and strip a section of the next covering layer. Movement of the carriages to their home position is electronically confirmed by optical switches 44, 45 which are actuated by passage of shutters 44', 45', fixedly mounted to carriages 22 and 24, respectively, between the beam and detector portions of the switches.

Another option in the programming of the microprocessor, either at the factory or by the operator, is to actuate stepper motors 110 and 112 to move gripping members 118 and 120 into engagement with the outer layer of the cable before actuating motor 26 to perform the cutting operation. This may be particularly advantageous for relatively long lengths of cut when the tendency of the end of the wire to "whip" due to forces imparted by the orbiting blade are greatest. Although the specific example shown herein employs linear stepper motors to move the gripping members, there is a multitude of options for effecting such movement including solenoids, gears, cams, etc. It is also emphasized that the stepper motors shown as providing power to move the elements axially and orbitally of the cable could be replaced by DC motors with the only significant design difference in the controls portion.

What is claimed is:

1. Apparatus for cutting and stripping a portion of a covering layer of preselected axial length from a terminal end of a filamentary member having a first diameter, said apparatus comprising:
   a) clamping jaws for engaging the filamentary member at a position spaced by a first distance from said terminal end to constrain the filamentary member against axial movement;
   b) blade means movable to cut through said layer at said preselected axial length from said terminal end;
   c) a guide bushing having a cylindrical passageway with a linear, central axis, forward and rear ends and a second diameter;
   d) support means for holding said bushing in a stationary position with said linear axis in a desired radial position and said forward end spaced a second distance from and closely adjacent to said preselected axial length from said terminal end;
   e) a motor for imparting movement to said blade means; and
   f) adjustment means for adjustably changing said desired radial position.

2. The apparatus of claims 1 wherein said second diameter is not more than about 0.004" greater than said first diameter.

3. The apparatus of claim 1 wherein said second diameter is not more than about 0.002" greater than said first diameter.

4. The apparatus of claim 1 wherein said adjustment means comprises portions of said support means selectively movable to change the position of said bushing in both horizontal and vertical directions in a plane perpendicular to said linear axis, thereby changing said position of said linear axis.

5. The apparatus of claim 4 wherein said portions of said support means comprise manually movable threaded members.

6. The apparatus of claim 5 wherein said threaded members comprise first and second screws selectively rotatable to move the radial position of said linear axis in horizontal and vertical directions, respectively.

* * * * *